US007065179B2

(12) United States Patent
Block et al.

(10) Patent No.: US 7,065,179 B2
(45) Date of Patent: Jun. 20, 2006

(54) MULTIPLE TARGET ANODE ASSEMBLY AND SYSTEM OF OPERATION

(75) Inventors: Wayne F. Block, Sussex, WI (US); J. Scott Price, Milwaukee, WI (US); Jiang Hsieh, Brookfield, WI (US); Eric Chabin, Brookfield, WI (US); Gorur N. Sridhar, Bangalore (IN)

(73) Assignee: General Electric Company, Schenectady, NY (US)

(*) Notice: Subject to any disclaimer, the term of this patent is extended or adjusted under 35 U.S.C. 154(b) by 120 days.

(21) Appl. No.: 10/605,943

(22) Filed: Nov. 7, 2003

(65) Prior Publication Data

US 2005/0100132 A1 May 12, 2005

(51) Int. Cl.
*H01J 35/06* (2006.01)
*H01J 35/08* (2006.01)
*H01G 1/60* (2006.01)

(52) U.S. Cl. .......................... 378/134; 378/124; 378/9; 378/4

(58) Field of Classification Search .................... 378/4, 378/9, 19, 20, 57, 119, 113, 124, 125, 134, 378/136, 143, 144, 146, 5, 115–118
See application file for complete search history.

(56) References Cited

U.S. PATENT DOCUMENTS

| | | | | |
|---|---|---|---|---|
| 2,942,126 | A * | 6/1960 | Silbermann | 378/109 |
| 4,637,040 | A * | 1/1987 | Sohval et al. | 378/9 |
| 5,335,255 | A * | 8/1994 | Seppi et al. | 378/4 |
| 5,511,105 | A * | 4/1996 | Knott | 378/134 |
| 6,125,167 | A | 9/2000 | Morgan | |
| 6,333,968 | B1 * | 12/2001 | Whitlock et al. | 378/136 |
| 6,553,096 | B1 * | 4/2003 | Zhou et al. | 378/122 |
| 6,798,865 | B1 * | 9/2004 | Tang | 378/119 |
| 6,850,595 | B1 * | 2/2005 | Zhou et al. | 378/122 |

* cited by examiner

*Primary Examiner*—Edward J. Glick
*Assistant Examiner*—Irakli Kiknadze
(74) *Attorney, Agent, or Firm*—Ziolkowski Patent Solutions Group, SC; Michael A. Della Penna; Carl B. Horton

(57) ABSTRACT

An anode assembly having multiple target electrodes is disclosed. Each target electrode produces an x-ray fan beam for radiographic data acquisition. The target electrodes are designed to sequentially generate an x-ray fan beam and therefore operate at a proportional duty cycle per scan. Power output capabilities of the anode assembly is increased without an increase in the size or thermal overloading of the anode assembly.

14 Claims, 6 Drawing Sheets

MULTIPLE TARGET ANODE ASSEMBLY AND SYSTEM OF OPERATION

BACKGROUND OF INVENTION

The present invention relates generally to diagnostic imaging and, more particularly, to an x-ray tube assembly having multiple x-ray sources. The present invention further relates to an anode assembly having multiple electron targets such that multiple x-ray fan beams may be produced.

X-ray or radiographic imaging is the basis of a number of diagnostic imaging systems. Computed tomography (CT) is one example of such a system that is predicated upon the acquisition of data using the principles of radiography. Typically, in CT imaging systems, a single x-ray source emits a single fan-shaped beam toward a subject or object, such as a patient or a piece of luggage. Hereinafter, the terms “subject” and “object” shall include anything capable of being imaged. The beam, after being attenuated by the subject, impinges upon an array of radiation detectors. The intensity of the attenuated beam radiation received at the detector array is typically dependent upon the attenuation of the x-ray beam by the subject. Each detector element of the detector array produces a separate electrical signal indicative of the attenuated beam received by each detector element. The electrical signals are transmitted to a data processing system for analysis which ultimately produces an image.

Generally, the x-ray source and the detector array are rotated about the gantry within an imaging plane and around the subject. X-ray sources typically include x-ray tubes, which emit the x-ray beam at a focal point. X-ray detectors typically include a collimator for collimating x-ray beams received at the detector, a scintillator for converting x-rays to light energy adjacent the collimator, and photodiodes for receiving the light energy from the adjacent scintillator and producing electrical signals therefrom.

Typically, each scintillator of a scintillator array converts x-rays to light energy. Each scintillator discharges light energy to a photodiode adjacent thereto. Each photodiode detects the light energy and generates a corresponding electrical signal. The outputs of the photodiodes are then transmitted to the data processing system for image reconstruction.

CT systems, as well as x-ray systems, typically utilize a rotating anode during the data acquisition process. Rotating the anode helps fan the x-ray fan beam, but, more importantly, reduces the thermal load on the anode. That is, the anode typically includes a single target electrode that is mounted or integrated with an anode disc. The anode disc is rotated by an induction motor during data acquisition. Since the electrons striking the anode deposit most of their energy as heat, with a small fraction emitted as x-rays, producing x-rays in quantities sufficient for acceptable image quality generates a large amount of heat. A number of techniques have been developed to accommodate the thermal load placed on the anode during the x-ray generate process.

For example, advancements in the detection of x-ray attenuation has allowed for a reduction in x-ray dose necessary for image acquisition. X-ray dose and tube current are directly related and, as such, a reduction in tube current results in a reduction in x-ray dosage. A drop in tube current, i.e. reduction in the number of striking electrons on the anode target, reduces the thermal load placed on the anode target during data acquisition. Simply, less power is needed to generate the x-rays necessary for data acquisition. X-rays are generated as a result of electrons emitted from a cathode striking a target electrode mounted to or integrated with the anode disc. The number of electrons emitted depends in part of the voltage potential placed across the cathode and anode. Increasing the voltage potential increases the number of emitted electrons. Since a minimum number of electrons must be generated for meaningful data acquisition, a mere reduction in tube current is insufficient to address the thermal load on the anode resulting from x-ray generation.

Another approach is predicated upon the spreading of the generated heat across the surface and mass of the anode disc. By rotating the anode disc as electrons are striking the target electrode, the heat generated therefrom may be spread across the anode disc rather than across the target electrode alone. This rotation of the anode disc effectively reduces the thermal load placed on the target electrode. As a result, tube current may be increased without thermal overloading of the anode. Generally, the faster the anode disc is rotated the higher the tube current that may be used.

Increasing the tube current and effectively the power levels of the x-ray tube assembly is particularly desirable for short duration high power reconstruction protocols. With these protocols, the gantry is caused to rotate at significantly fast rotational speeds. Through increased rotational gantry speed, the overall exam time may be decreased. Decreasing the overall exam or scan time improves patient throughput and reduces patient discomfort which reduces patient-induced motion artifacts in the reconstructed image. To support faster gantry speeds, the x-ray tube must output sufficiently more instantaneous power which is required for short duration protocols.

To provide the requisite instantaneous power needed for short duration protocols, the x-ray tube must output more power without exceeding the thermal load of the target electrode. As mentioned above, rotating the anode disc during x-ray generation reduces the thermal load on the electrode target. Known CT systems utilize a rotating anode disc and due to material strength limitations, it is not feasible to simply increase the rotational speed of the anode disc or its size. Another means to increase the power output of the x-ray tube is to simply increase its size. Increasing the tube size and mass however is also not a feasible solution. The gantry must support rotation of the x-ray tube and any increase in x-ray tube size and weight increases the support burden placed on the gantry. As a result, the size of the gantry would have to be increased yielding a much larger CT scanner.

It would therefore be design a method and system for increasing the power output of an x-ray tube assembly without increasing its size or mass.

BRIEF DESCRIPTION OF INVENTION

The present invention is a directed method and system of x-ray generation for radiographic and CT data acquisition and image reconstruction that overcomes the aforementioned drawbacks. An x-ray tube assembly is disclosed and includes an anode disc having multiple target electrodes. Each target electrode receives electrons emitted by multiple cathodes and, as such, each target electrode operates as an x-ray source. The multiple cathodes are controlled such that a particular cathode does not fire until each other cathode is sequentially fired. In this regard, the duty cycle of each target electrode is based on the number of target electrodes incorporated with the anode disc.

Therefore, in accordance with one aspect, the present invention includes an anode assembly having an anode disc and a first x-ray source connected to the anode disc and configured to emit a first fan beam of x-rays. The anode assembly further includes a second x-ray source connected to the anode disc and configured to emit a second fan beam of x-rays. The first x-ray source has a distance from a center of the anode disc different than that of the second x-ray source.

In accordance with another aspect of the present invention, an x-ray tube assembly includes a plurality of independently controllable electron sources configured to emit electrons. A plurality of target electrodes are provided and configured to receive electrons emitted by the plurality of electron sources and emit a plurality of fan beams of radiographic energy in response thereto.

According to another aspect, the present invention includes a CT system having a rotatable gantry comprising a bore centrally disposed therein and a table movable fore and aft through the bore and configured to position a subject for CT data acquisition. A detector array is disposed within the rotatable gantry and configured to detect high frequency electromagnetic energy attenuated by the subject. Multiple high frequency electromagnetic energy projection sources are positioned within the rotatable gantry and configured to project multiple high frequency electromagnetic energy fan beams toward the subject. Each projection source is configured to operate at a proportional duty cycle per scan.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The operating environment of the present invention is described with respect to a four-slice computed tomography (CT) system. However, it will be appreciated by those skilled in the art that the present invention is equally applicable for use with single-slice or other multi-slice configurations. Moreover, the present invention will be described with respect to the detection and conversion of x-rays. However, one skilled in the art will further appreciate that the present invention is equally applicable for the detection and conversion of other high frequency electromagnetic energy. The present invention will be described with respect to a "third generation" CT scanner, but is equally applicable with other CT systems. The present invention may also be applicable to x-ray or other radiographic imaging systems.

Figure 1:
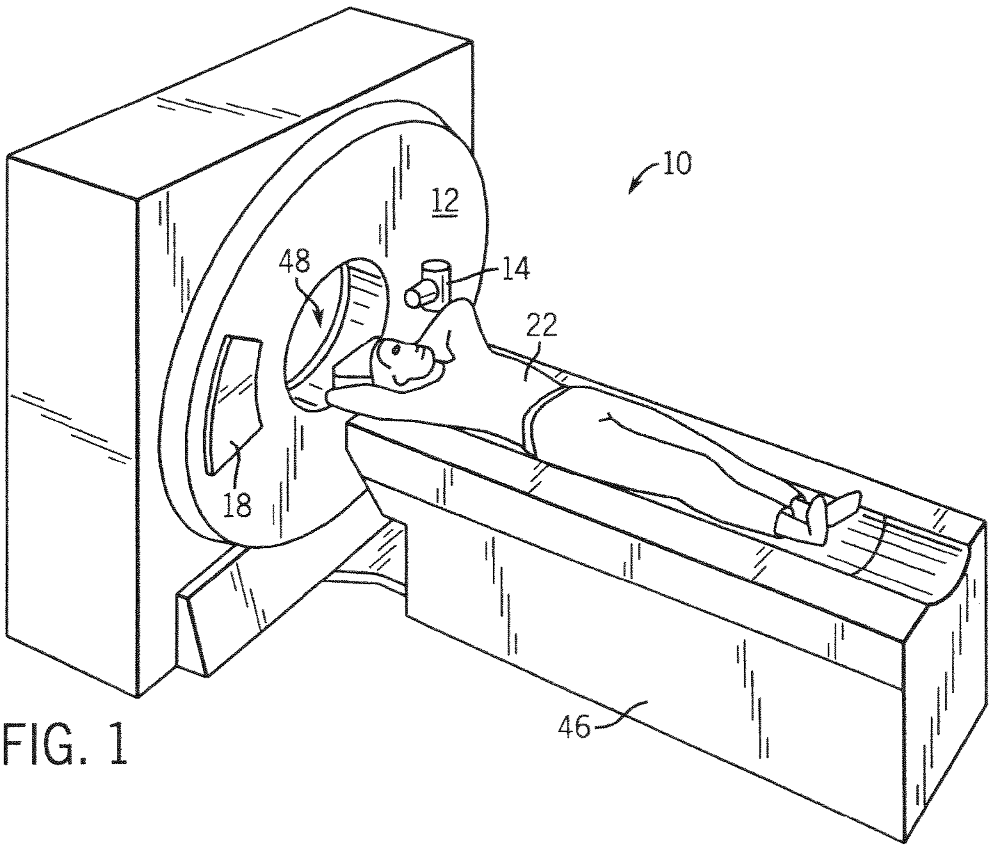
FIG. 1 is a pictorial view of a CT imaging system.
Figure 2:
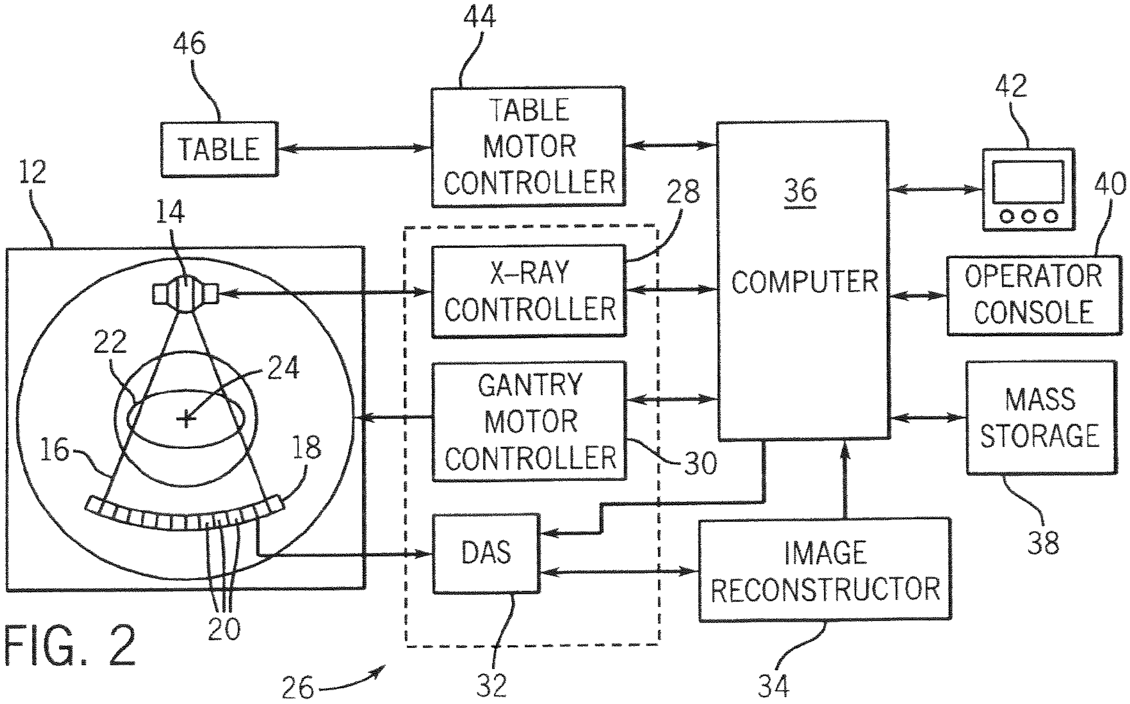
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of the gantry 12. Detector array 18 is formed by a plurality of detectors 20 which together sense the projected x-rays that pass through a medical patient 22. Each detector 20 produces an electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. A data acquisition system (DAS) 32 in control mechanism 26 samples analog data from detectors 20 and converts the data to digital signals for subsequent processing. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves portions of patient 22 through a gantry opening 48.

Figure 4:
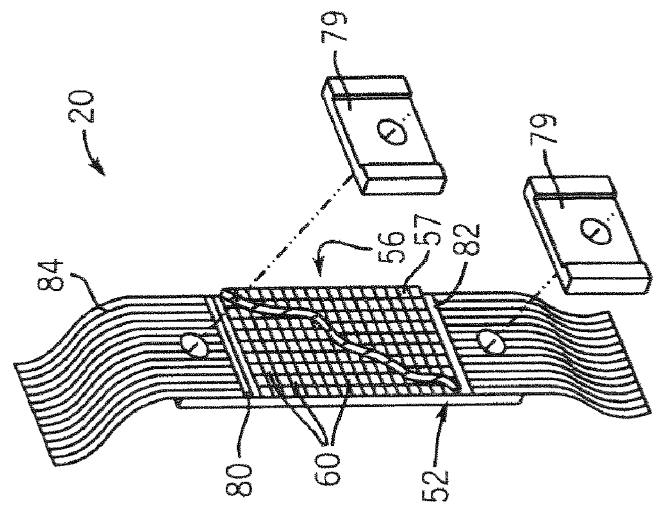
FIG. 4 is a perspective view of one embodiment of a detector.
Figure 3:
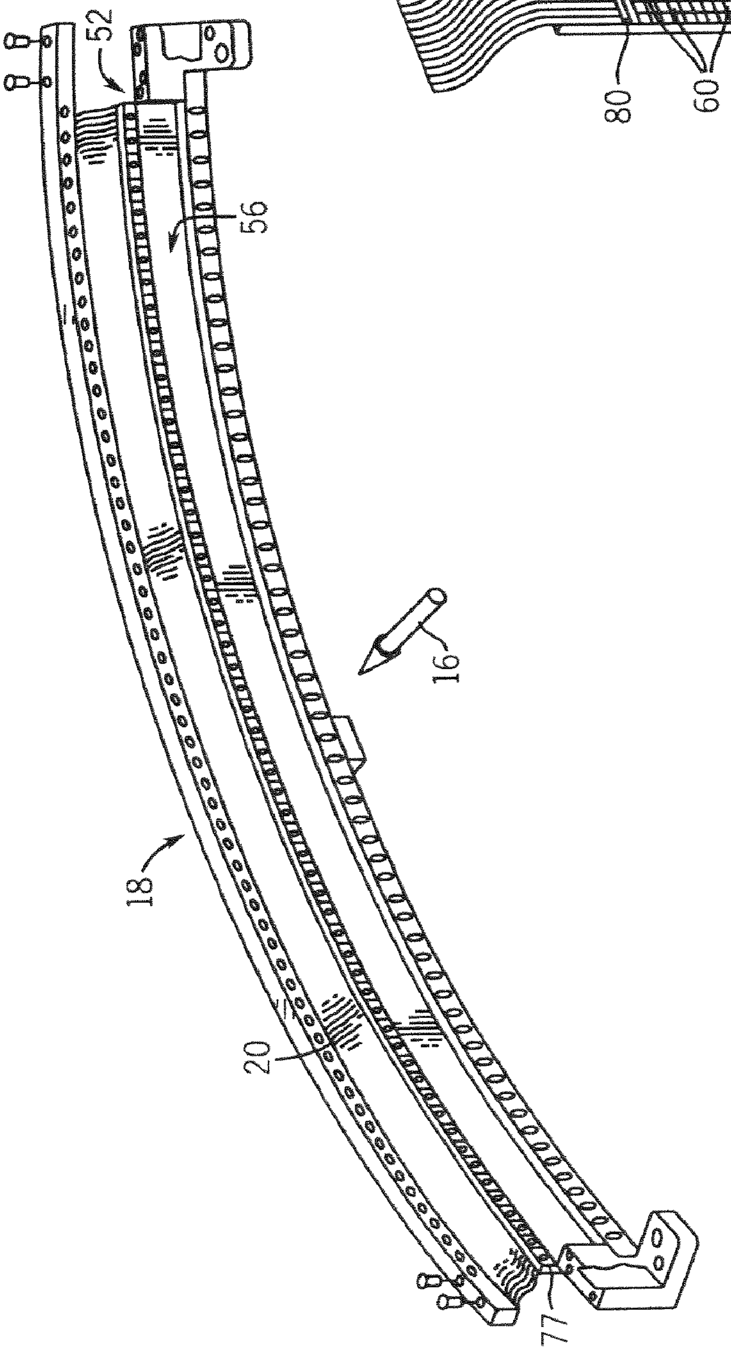
FIG. 3 is a perspective view of one embodiment of a CT system detector array.

As shown in FIGS. 3 and 4, detector array 18 includes a plurality of scintillators 57 forming a scintillator array 56. A collimator (not shown) is positioned above scintillator array 56 to collimate x-ray beams 16 before such beams impinge upon scintillator array 56.

In one embodiment, shown in FIG. 3, detector array 18 includes 57 detectors 20, each detector 20 having an array size of 16×16. As a result, array 18 has 16 rows and 912 columns (16×57 detectors) which allows 16 simultaneous slices of data to be collected with each rotation of gantry 12.

Switch arrays 80 and 82, FIG. 4, are multi-dimensional semiconductor arrays coupled between scintillator array 56 and DAS 32. Switch arrays 80 and 82 include a plurality of field effect transistors (FET) (not shown) arranged as multi-dimensional array. The FET array includes a number of electrical leads connected to each of the respective photodiodes 60 and a number of output leads electrically connected to DAS 32 via a flexible electrical interface 84. Particularly, about one-half of photodiode outputs are electrically connected to switch 80 with the other one-half of photodiode outputs electrically connected to switch 82. Additionally, a reflector layer (not shown) may be interposed between each scintillator 57 to reduce light scattering from adjacent scintillators. Each detector 20 is secured to a detector frame 77, FIG. 3, by mounting brackets 79.

Switch arrays 80 and 82 further include a decoder (not shown) that enables, disables, or combines photodiode outputs in accordance with a desired number of slices and slice resolutions for each slice. Decoder, in one embodiment, is a decoder chip or a FET controller as known in the art. Decoder includes a plurality of output and control lines coupled to switch arrays 80 and 82 and DAS 32. In one embodiment defined as a 16 slice mode, decoder enables switch arrays 80 and 82 so that all rows of the photodiode array 52 are activated, resulting in 16 simultaneous slices of data for processing by DAS 32. Of course, many other slice combinations are possible. For example, decoder may also select from other slice modes, including one, two, and four-slice modes.

Figure 5:
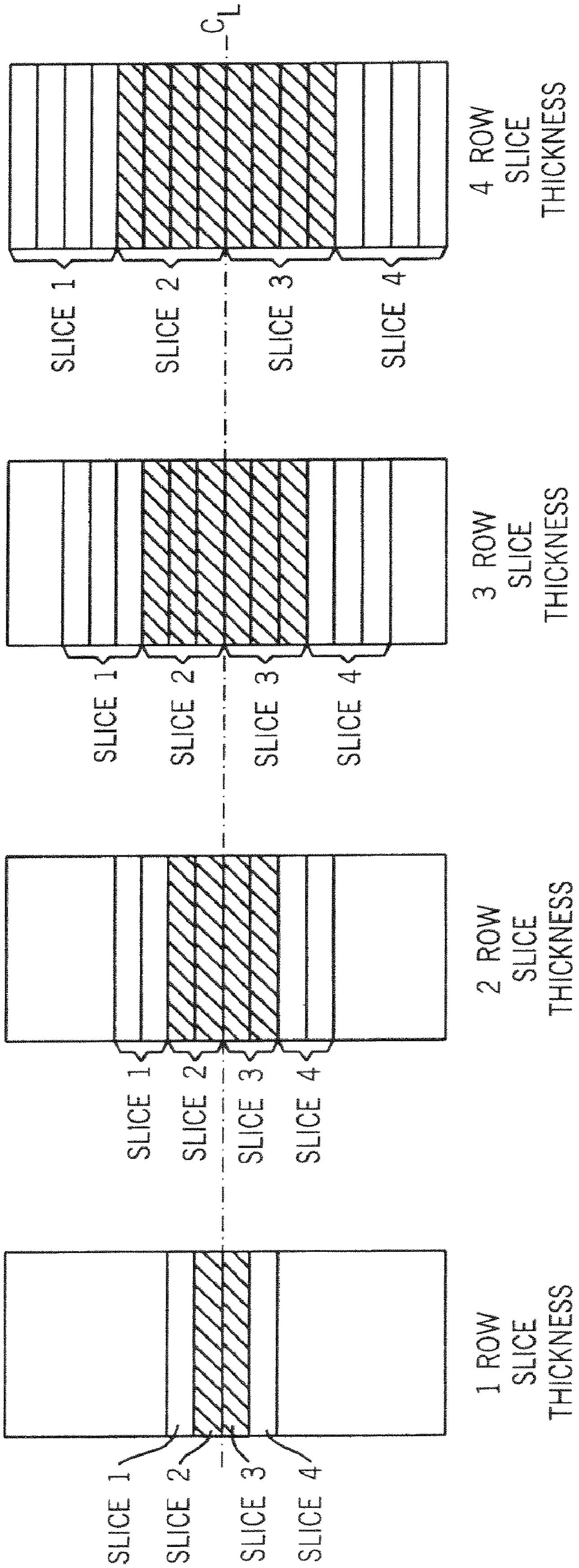
FIG. 5 is illustrative of various configurations of the detector in FIG. 4 in a four-slice mode.

As shown in FIG. 5, by transmitting the appropriate decoder instructions, switch arrays 80 and 82 can be configured in the four-slice mode so that the data is collected from four slices of one or more rows of photodiode array 52. Depending upon the specific configuration of switch arrays 80 and 82, various combinations of photodiodes 60 can be enabled, disabled, or combined so that the slice thickness may consist of one, two, three, or four rows of scintillator array elements 57. Additional examples include, a single slice mode including one slice with slices ranging from 1.25 mm thick to 20 mm thick, and a two slice mode including two slices with slices ranging from 1.25 mm thick to 10 mm thick. Additional modes beyond those described are contemplated.

Figure 6:
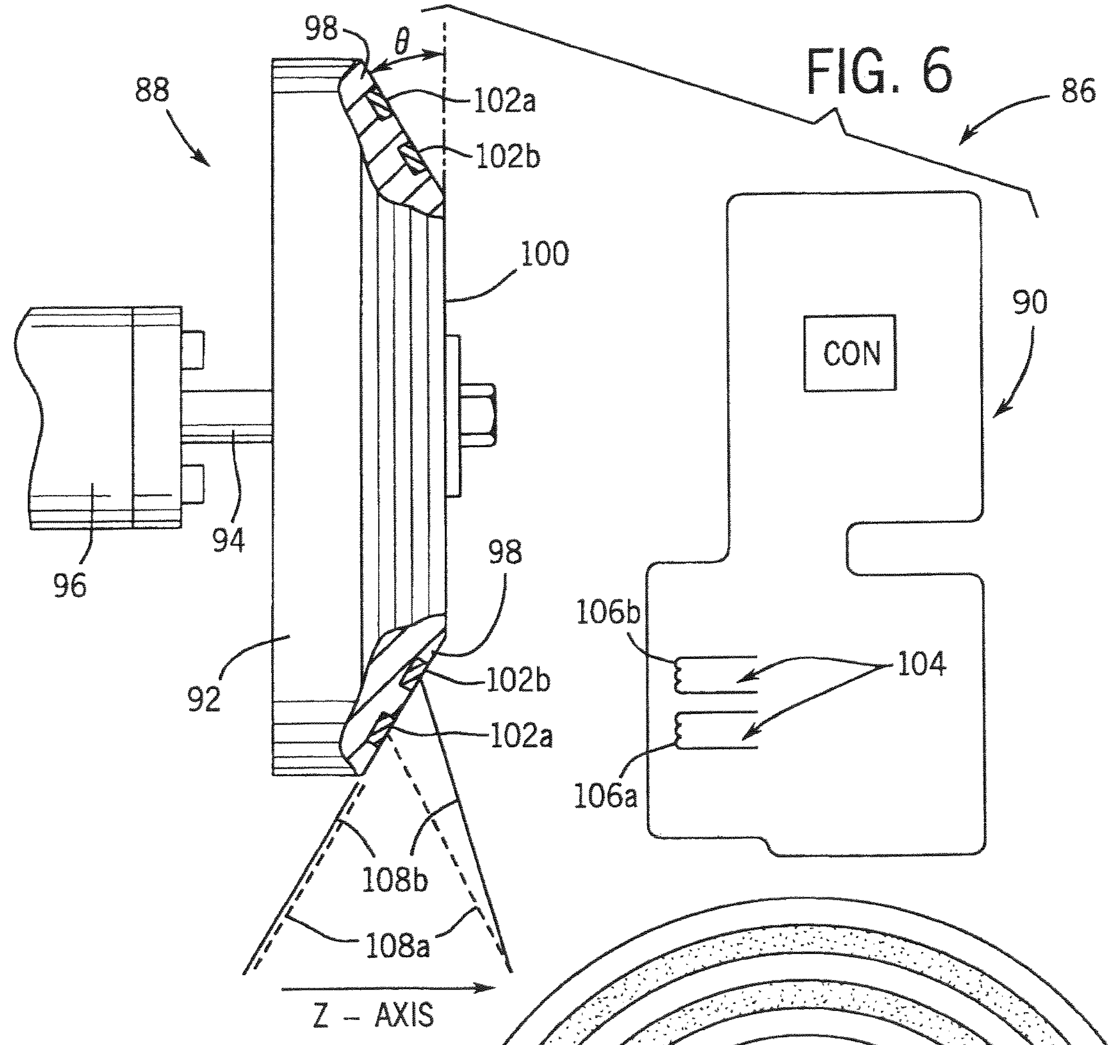
FIG. 6 is a side elevational view of a anode assembly in accordance with the present invention.

Referring now to FIG. 6, a portion of an x-ray tube assembly 86 is shown in side elevation. The x-ray tube assembly generally forms the x-ray projection source 14 of FIGS. 1 and 2. X-ray tube assembly 86 includes an anode assembly 88 and a cathode assembly 90. The anode assembly 88 includes a rotatable anode disc 92 supported by an anode stem 94 that is operationally connected to a rotor and bearing assembly 96. A stator assembly (not shown) together with rotor and bearing assembly 96 induces rotation of stem 94 that supports rotation of anode disc 92. Preferably, anode stem 94 is formed of poor heat conducting material so that heat generated during the generation of x-rays is not passed to the rotor and bearing assembly 96.

Anode disc 92 includes a bevel or tapered region 98 that extends from face 100. Mounted to or integrally formed within the bevel region 98 are multiple electrode target tracks 102 that extend circumferentially around the anode disc 92. The multiple electrode target tracks are preferably formed of tungsten but other materials high in melting point temperature and atomic number may also be used. Each electrode target track is designed to emit an x-ray fan beam in response to electrons striking thereon. Angle θ corresponds to an anode target angle and defines the amount of taper from anode disc face 100. Angle θ is selected based on the desired spatial coverage of the fan beam generated by each electrode target 102. For large field area coverage, the anode disc is constructed to have a larger anode target angle θ. In contrast, for smaller coverage, a more acute beveling is used. Additionally, a smaller anode angle provides a smaller effective focal spot for the same actual focal area. One skilled in the art will readily appreciate that a smaller effective focal spot size provides better spatial resolution. However, a smaller or more acute anode target angle limits the size of the usable x-ray field due to cut-off of the x-ray fan beam.

Still referring to FIG. 6, cathode assembly 90 includes multiple electron sources 104 that emit electrons toward electrode targets 102 of the anode assembly 88 when a voltage potential is placed across the anode and cathode assemblies 88, 90. The number of electrons increases as the voltage placed across the assemblies increases. Since the amount of x-ray generation is a function of the number of electrons emitted from the electron sources 104 that strike target electrodes 102, an increase in current causes an increase in x-ray dose. As discussed above, increasing the tube current increases heat generation and, as such, anode disc 92 is rotated during data acquisition.

Figure 8:
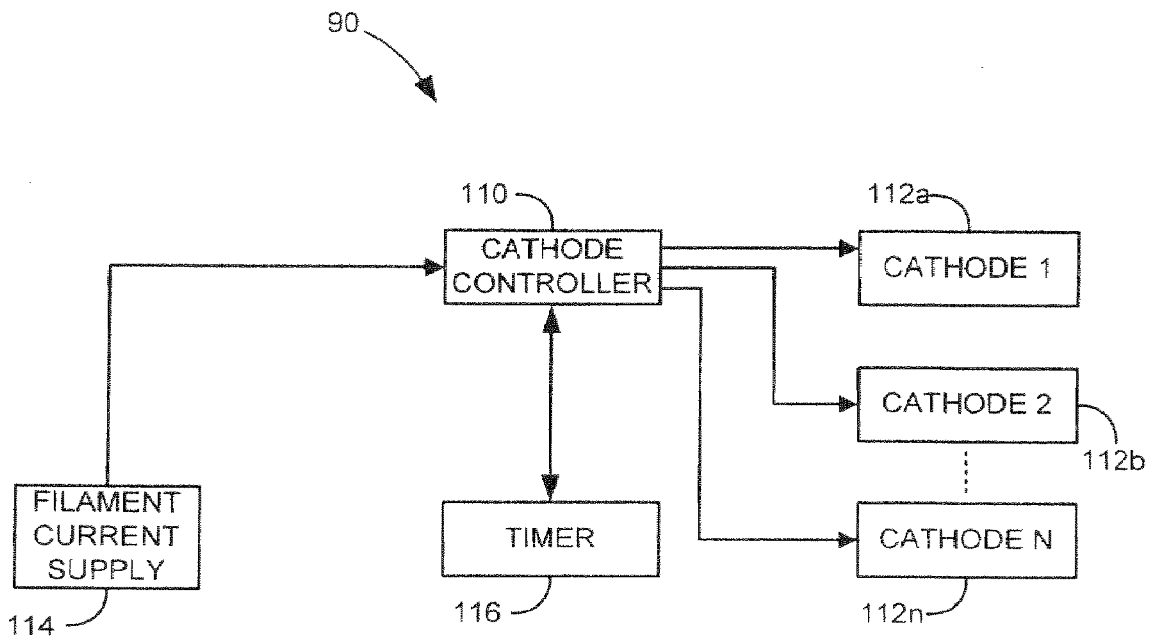
FIG. 8 is a schematic diagram of an x-ray tube assembly in accordance with the present invention.

Electron sources 104, whose number corresponds to the number of target electrode tracks 102, e.g. two in the illustrated example, are formed of helical filament of tungsten wire 106 surrounded by a focusing cup (not shown) that are connected to a filament circuit, FIG. 8. The filament circuit provides a voltage to the filaments thereby producing a current through the filament. Electrical resistance heats the filament and, through thermionic emission, the filament releases electrons that are directed toward the target electrodes 102. As will be described, the electron sources are caused to sequentially "fire" and, as such, a particular electron source is not caused to emit electrons until every other electron source has fired. In this regard, the respective electrode targets operate at a proportional duty cycle. For instance, in the illustrated example of two electrode tracks 102*a,b* and two electron sources 104*a, b*, the electron sources alternately fire which causes each track 102*a,b* to operate at a 50 percent duty cycle per scan. Operating at this proportional duty cycle effectively reduces the thermal burden placed on each electrode target and supports an increase in overall total power output without an increase in anode size or increase in anode disc rotational speed.

Each electrode target track 102*a,b* produces a respective x-ray fan beam 108*a,b*. The x-ray beams are generated when electrons from the electron sources 104*a,b* strike target electrodes 102*a,b*. As shown in FIG. 6, the anode target angle 0 and the orientation of target electrode tracks 102*a,b* with respect to one another are selected such that each fan beam has a similar spatial coverage. Additionally, the fan beams are generated such that the respective penumbra of each fan extends along the z- or patient long axis. Since the target electrodes 102 operate at a proportional duty cycle, fan beams 108 are generated based on the duty cycle of a respective target electrode. That is, while multiple fan beams are shown as occurring at a singular point in time, only one fan beam is preferably generated at a particular moment in time. The depiction of multiple fan beams is to illustrate the similar spatial coverage of each fan beam. However, it is contemplated that for some protocols more than one or all of the target electrodes may be caused to generate a fan beam simultaneously at a particular point in time.

Figure 7:
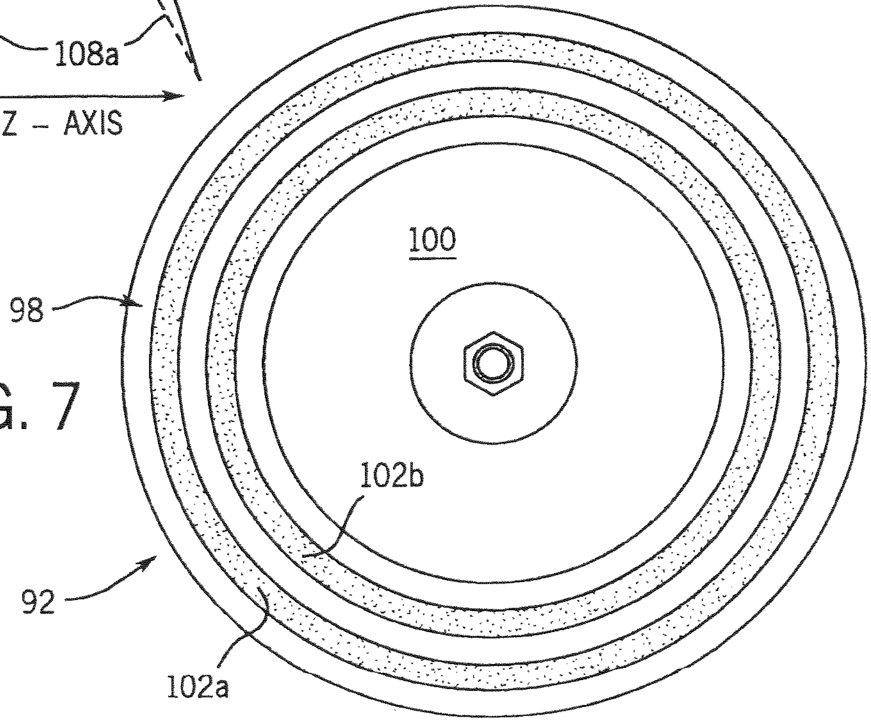
FIG. 7 is an end view of the anode disc illustrated in FIG. 6.

Referring now to FIG. 7, an end view of anode disc 92 illustrates the concentric orientation of each target electrode track 102*a,b* relative to one another. While this distance is exaggerated in FIG. 7, it is preferred that the electrode tracks are spaced apart so that the distance between the respective focal sports is approximately one millimeter in the z- or patient long axis direction. Since the focal spots are approximately one millimeter apart in the z-direction, the image reconstruction algorithm may inhibit any image artifacts by effectively considering the respective focal spots as a single focal spot. Additionally, the relative orientation of each target electrode 102*a,b* on the anode disc bevel 98 is such that the separation in the y-direction may also be taken into account during the image reconstruction process. In addition, the electrode target tracks may be spatially separated along the x- or patient width axis which supports implementation of the x-ray tube assembly in a "wobble" mode to improve spatial resolution. It should be noted that for longer scan protocols, the conductivity of the anode disc would allow the temperature between the target electrode tracks to equalize. In this regard, the proportionality of the duty cycles for the respective target electrode tracks is lost for longer scan protocols.

Referring now to FIG. 8, cathode assembly 90 is schematically shown as including a cathode controller 110 that is operationally connected to each electron source or cathode 112*a*, 112*b* . . . 112*n*. Controller 110 is electrically connected between the cathodes 112 and filament current supply 114. As noted above, the electron sources are configured to sequentially fire before a particular source is re-fired. To this end, controller 110 is also connected to a timer 116 that monitors the firing times of each electron source and provides control feedback to the controller 110 regarding the firing of the electron sources. One skilled in the art will readily appreciate that the firing of the electron sources may also be controlled based on other inputs such as the thermal load on each target electrode. That is, the temperature of each electrode target may be monitored and provided as feedback to the controller 110 to determine which electron source should be fired. Accordingly, the controller 110 may compare the feedback to a look-up table of values or determine in real-time if a particular target electrode is being thermally stressed. In this regard, a particular electron source may be fired repeatedly or out of order depending on the particular thermal loads on the target electrodes or the specifics of the particular scan. In another embodiment, the controller may be programmed to fire the electron sources according to a particular pattern to carry out a particular imaging protocol.

Figure 9:
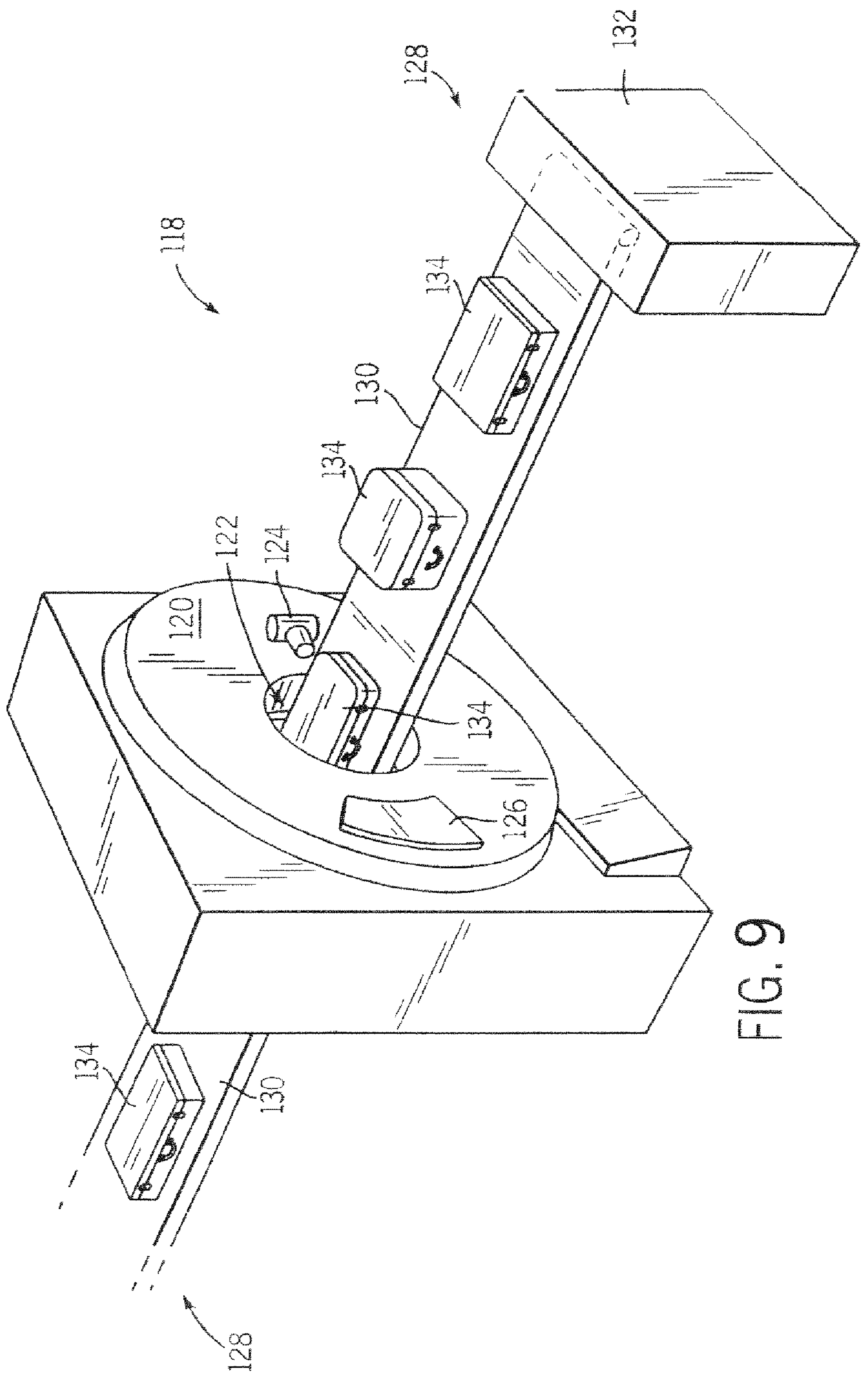
FIG. 9 is a pictorial view of a CT system for use with a non-invasive package inspection system.

FIG. 9 illustrates a package/baggage inspection system 118 that may incorporate the present invention. The inspection system includes a rotatable gantry 120 having an opening 122 therein through which packages or pieces of baggage may pass. The rotatable gantry 120 houses a high frequency electromagnetic energy source 124 as well as a detector assembly 126. A conveyor system 128 is also provided and includes a conveyor belt 130 supported by structure 132 to automatically and continuously pass packages or baggage pieces 134 through opening 122 to be scanned. Objects 134 are fed through opening 122 by conveyor belt 130, imaging data is then acquired, and the conveyor belt 130 removes the packages 134 from opening 122 in a controlled and continuous manner. As a result, postal inspectors, baggage handlers, and other security personnel may non-invasively inspect the contents of packages 134 for explosives, knives, guns, contraband, etc.

Therefore, in accordance with one embodiment, the present invention includes an anode assembly having an anode disc and a first x-ray source connected to the anode disc and configured to emit a first fan beam of x-rays. The anode assembly further includes a second x-ray source connected to the anode disc and configured to emit a second fan beam of x-rays. The first x-ray source has a distance from a center of the anode disc different than that of the second x-ray source.

In accordance with another embodiment of the present invention, an x-ray tube assembly includes a plurality of independently controllable electron sources configured to emit electrons. A plurality of target electrodes are provided and configured to receive electrons emitted by the plurality of electron sources and emit a plurality of fan beams of radiographic energy in response thereto.

According to another embodiment, the present invention includes a CT system having a rotatable gantry comprising a bore centrally disposed therein and a table movable fore and aft through the bore and configured to position a subject for CT data acquisition. A detector array is disposed within the rotatable gantry and configured to detect high frequency electromagnetic energy attenuated by the subject. Multiple high frequency electromagnetic energy projection sources are positioned within the rotatable gantry and configured to project multiple high frequency electromagnetic energy fan beams toward the subject. Each projection source is configured to operate at a proportional duty cycle per scan.

The present invention has been described in terms of the preferred embodiment, and it is recognized that equivalents, alternatives, and modifications, aside from those expressly stated, are possible and within the scope of the appending claims.

What is claimed is:

1. An x-ray tube assembly comprising:

a plurality of independently controllable electron sources configured to emit electrons;

an anode disc;

a plurality of target electrodes disposed on the anode disc and configured to receive electrons emitted by the plurality of independently controllable electron sources and emit a plurality of fan beams of radiographic energy in response thereto;

a thermal feedback loop operably connected to provide feedback indicative of thermal conditions of at least one target electrode; and an electron firing controller operably connected to the thermal feedback loop and configured to selectively fire the plurality of independently controllable electron sources to maintain a thermal load on the at least one target electrode below a given threshold.

2. The assembly of claim 1 wherein the thermal feedback loop provides feedback indicative of a thermal load on each target electrode and wherein the controller is configured to disable an electron source corresponding to a given target electrode if the thermal load of the given target electrode exceeds the given threshold.

3. The assembly of claim 1 wherein the thermal feedback loop provides feedback regarding a firing duration of the at least one target electrode and wherein the controller is configured to determine a temperature of the at least one target electrode from the firing duration.

4. The assembly of claim 1 wherein the controller is configured to determine a thermal stress on the at least one target electrode in near real-time.

5. The assembly of claim 1 wherein the controller is configured to fire each of the plurality of independently controllable electron sources in a sequential manner before re-firing of an electron source if no target electrode is under an unacceptable thermal stress.

6. The assembly of claim 1 wherein the plurality of independently controllable electron sources includes a first target electrode at a first radial distance from a center of the anode disc to produce a first spatial coverage and a second target electrode at a second radial distance from the center of the anode disc that is different than the first radial distance to produce a second spatial coverage that is substantially similar to the first spatial coverage.

7. The assembly of claim 1 wherein the plurality of target electrodes is oriented with respect to one another such that each fan beam has a similar spatial coverage.

8. The assembly of claim 1 wherein each fan beam extends along a z-axis.

9. The assembly of claim 1 wherein the plurality of electron sources includes a plurality of tungsten targets integrated in a beveled portion of the anode disc.

10. A CT system comprising:

a rotatable gantry having a bore centrally disposed therein;

a table movable fore and aft through the bore and configured to position a subject for CT data acquisition;

a detector array disposed within the rotatable gantry and configured to detect x-radiation attenuated by the subject;

an anode disc positioned within the rotatable gantry;

multiple x-ray sources extending circumferentially about the anode disc and configured to project x-ray fan beams toward the subject; and a controller operably connected to the multiple x-ray sources and configured to selectively fire the multiple x-ray sources based on respective thermal stresses on the multiple x-ray sources;

wherein the controller determines the respective thermal stresses on the multiple x-ray sources.

11. The CT system of claim 10 wherein each x-ray source includes a tungsten electrode that generates an x-ray fan beam when bombarded with electrons from an electron source, and the controller operably connected to receive thermal feedback of each tungsten electrode to determine a thermal stress of each tungsten electrode.

12. The CT system of claim 11 wherein the controller causes x-ray emission of each tungsten electrode based on a proportional duty cycle if no tungsten electrode is under an unacceptable thermal stress.

13. The CT system of claim 12 wherein each tungsten electrode has a respective electron source, and wherein the controller disables a given electron source as long as the corresponding tungsten electrode is under an unacceptable thermal stress.

14. The CT system of claim 10 wherein the multiple x-ray sources includes:

a rotatable anode disc having a beveled face;

a first tungsten electrode track disposed on the beveled face and extending circumferentially about the disc at a first radius; and a second tungsten electrode track disposed on the beveled face and extending circumferentially about the disc at a second, different from the first, radius.

* * * * *